J. F. O'SHAUGHNESSY.
MACHINE FOR USE IN GATHERING COTTON.
APPLICATION FILED JUNE 2, 1913.

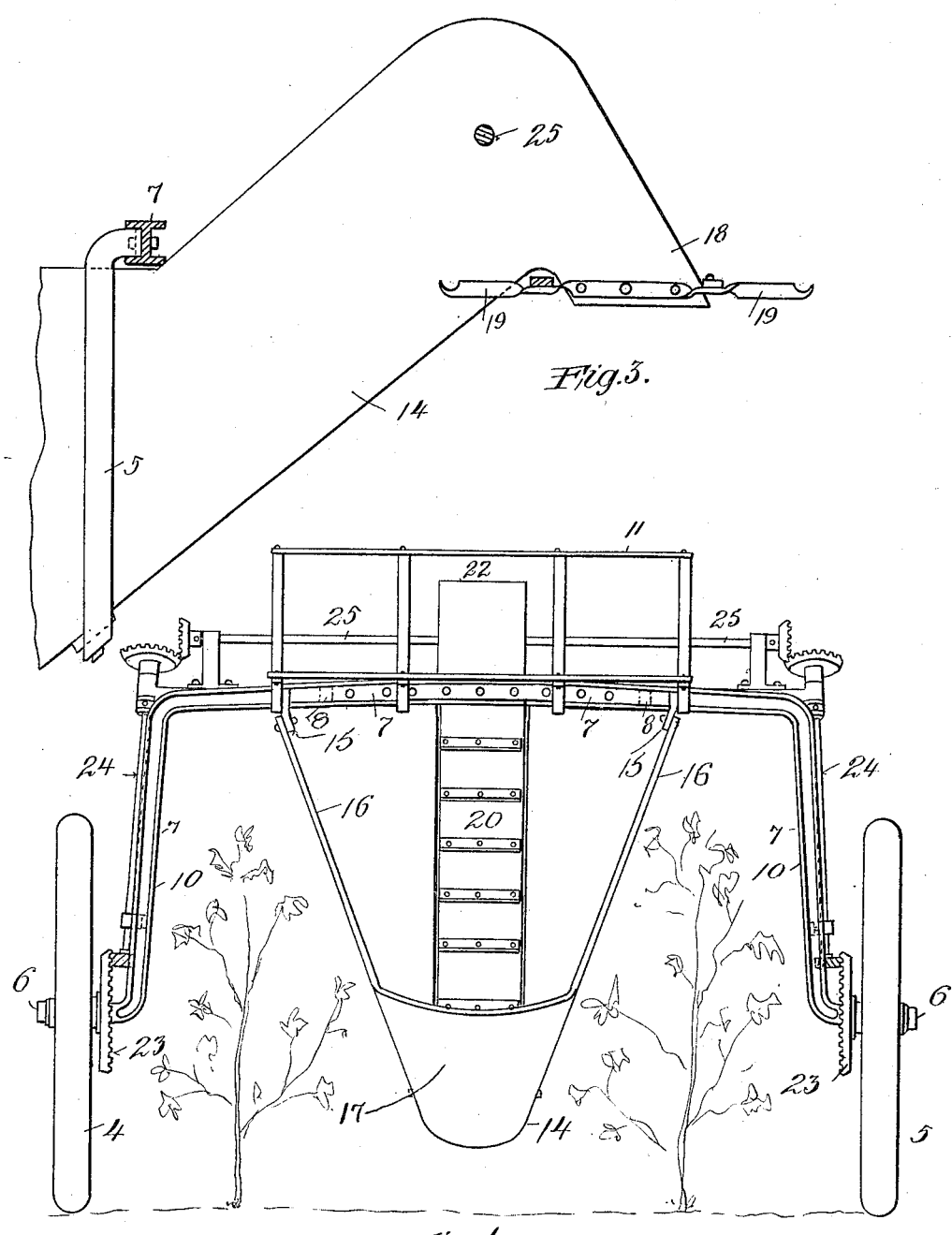

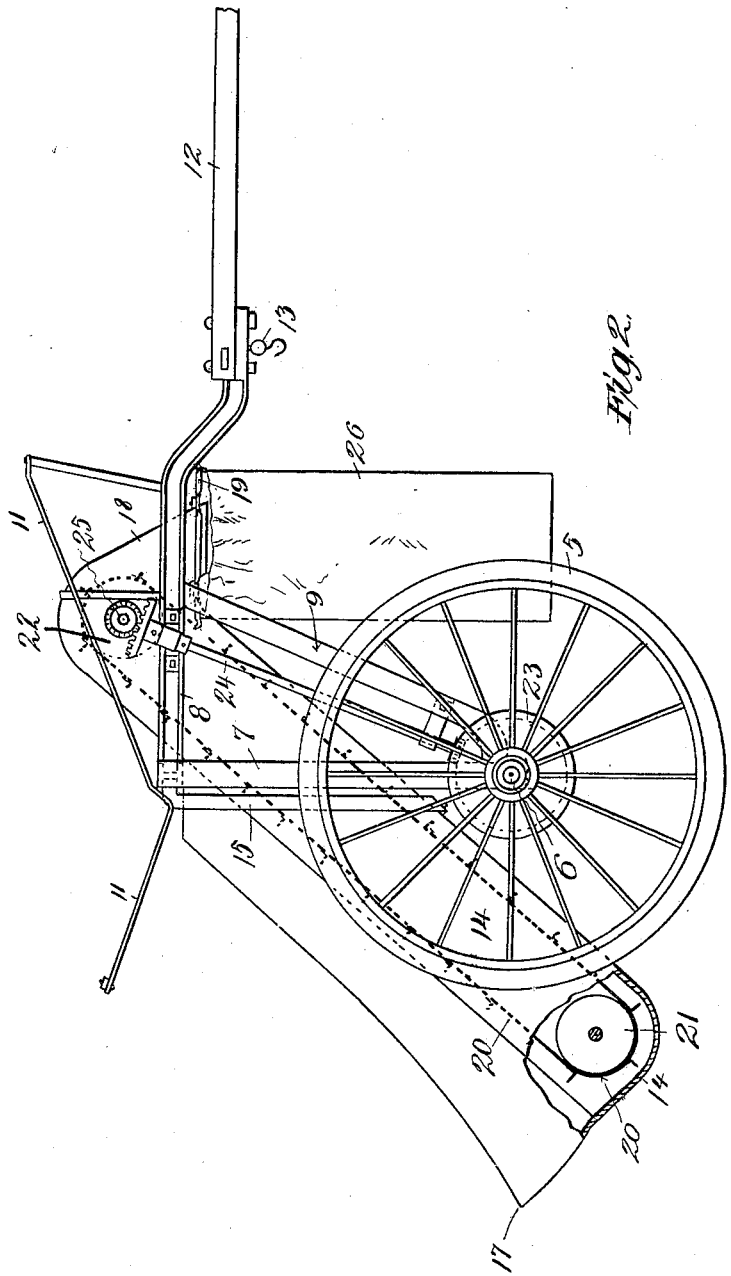

1,103,618.

Patented July 14, 1914.
3 SHEETS—SHEET 3.

Witnesses:
Inventor
James F. O'Shaughnessy
By his Attorney

UNITED STATES PATENT OFFICE.

JAMES F. O'SHAUGHNESSY, OF NEW YORK, N. Y., ASSIGNOR, BY MESNE ASSIGNMENTS, TO COTTON GATHERING CORPORATION, OF NEW YORK, N. Y., A CORPORATION OF DELAWARE.

MACHINE FOR USE IN GATHERING COTTON.

1,103,618.     Specification of Letters Patent.     Patented July 14, 1914.

Application filed June 2, 1913. Serial No. 771,371.

*To all whom it may concern:*

Be it known that I, JAMES F. O'SHAUGHNESSY, a citizen of the United States, residing at New York, county of New York, State of New York, have made a certain new and useful Invention in Machines for Use in Gathering Cotton, of which the following is a specification.

This invention relates to machines for use in gathering cotton.

The object of the invention is to provide a machine which is light, simple and economical to manufacture, and efficient for use in harvesting cotton.

A further object is to provide a machine of the sulky or two-wheeled type and having a receptacle into which the picked cotton is deposited from the hands of the operators and in which operates a conveyer to deliver the deposited cotton into bags arranged to receive it.

Other objects will appear more fully hereinafter.

The invention consists substantially in the construction, combination, location and relative arrangement of parts all as will be more fully hereinafter set forth, as shown in the accompanying drawings, and finally pointed out in the appended claims.

Figure 5:
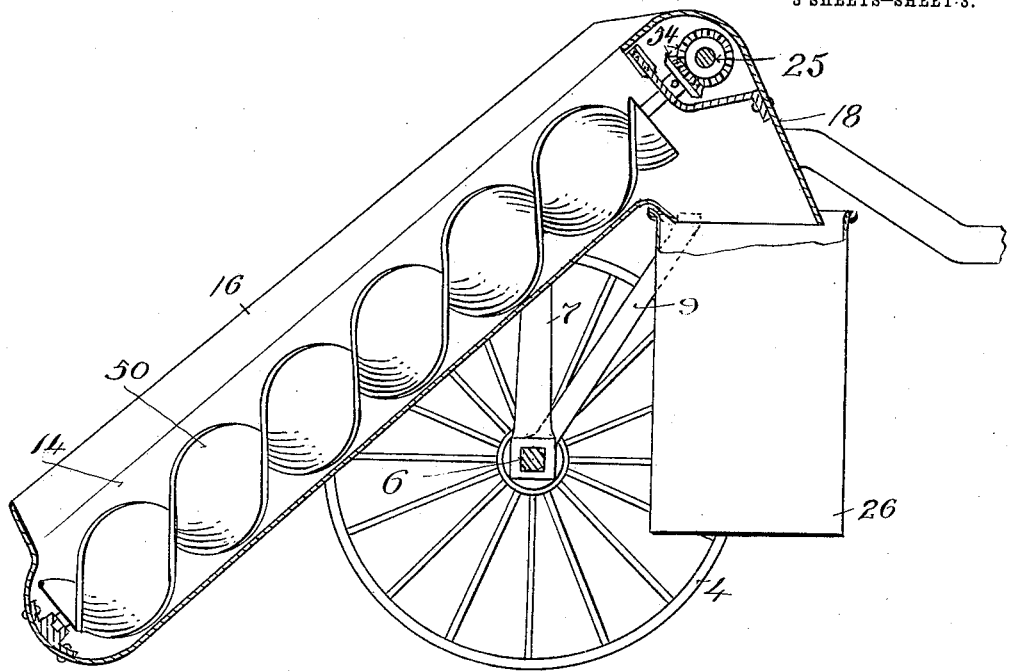
Figure 4:
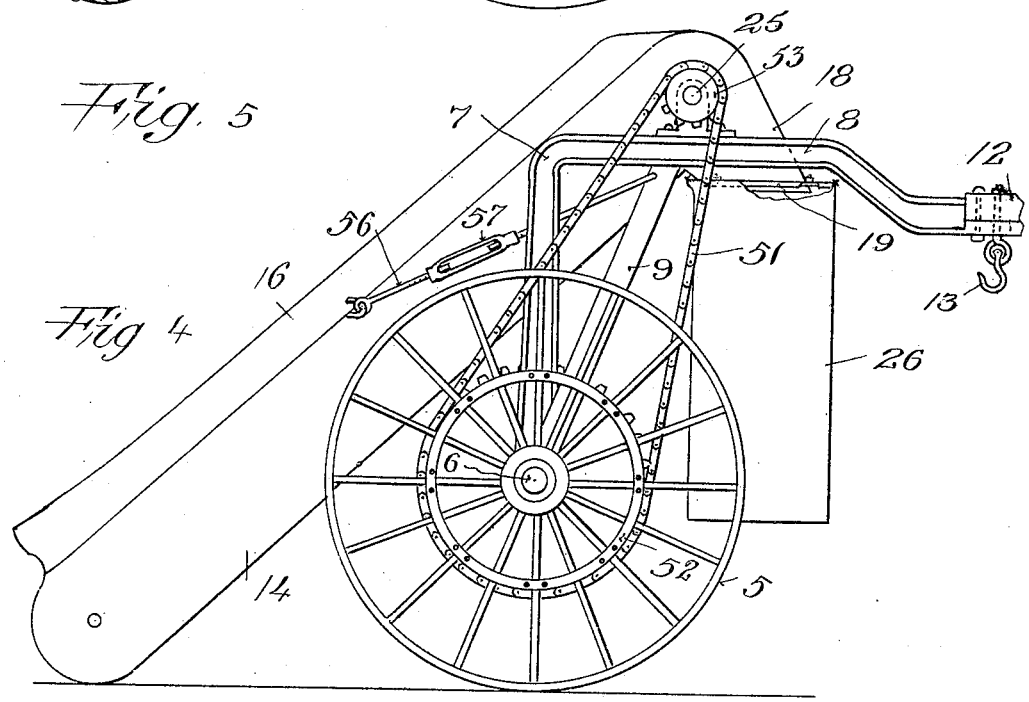

Referring to the accompanying drawings, and to the various views and reference signs appearing thereon, Figure 1 is a view in rear elevation of a machine embodying the principles of my invention. Fig. 2 is a side view of the same. Fig. 3 is a broken view in side elevation of the conveyer frame showing a support for the bag at the mouth or delivery end of the conveyer. Fig. 4 is a view similar to Fig. 2 showing a modified arrangement of drive gearing for the conveyer. Fig. 5 is a view in longitudinal vertical section showing a modified form of conveyer.

The same part is designated by the same reference numeral wherever it occurs throughout the several views.

The difficulty heretofore experienced in employing machines for relieving the laborers of the fatigue and toil incident to the cotton picking or gathering operation, has been the great weight of the machine and the complicated gearing and operating mechanism employed. It is difficult to handle large heavy machines in the field, and the complicated machinery requires the constant care and attention of a skilled mechanic, the ordinary farm laborer being unfitted for the purpose. Moreover, the cost of construction of big heavy machines places them out of the reach of the small farmers. For these and other reasons, machines of this class have not, so far, come into extensive use.

It is among the special purposes of the present invention to provide a machine which is exceedingly simple in structure and economical to manufacture and therefore the cost of which is capable of being brought within the reach of farmers owning and cultivating small farms; which is efficient in that it provides a receptacle into which the picked cotton is deposited from the hands of the operators, thereby relieving the operators of the necessity of carrying bags to receive the cotton which has been the almost universal custom in practice, and which bags not only impose wearisome toil, fatigue and wear on the laborers by reason of the increasing weight thereof, as the work progresses and the bags become filled but which also hamper the free movements of the laborers in their work, and hence materially decreases their daily output or capacity.

In carrying out my invention I provide a machine of the sulky or two-wheeled type, that is, a machine having only two wheels and a light sulky frame supported thereby, with the axle bar arched upwardly so as to enable the supporting wheels to straddle one or more, preferably two, rows of cotton stalks. I also provide the sulky frame with a rearwardly and downwardly extending casing which has outwardly flaring sides and which forms a receiving receptacle. In this casing is arranged to operate a conveyer. The machine is designed to be pulled or hauled through the field, either manually or by any suitable or convenient propelling power, such as a mule or horse, and in a manner familiar to even the unskilled labor such as is employed on farms.

The casing is supported upon the frame at a point preferably about midway the distance between the supporting wheels, and it extends downwardly and rearwardly between the two rows of cotton stalks which are spanned by the sulky frame of the machine, and I arrange the conveyer which operates in the casing, to deliver the deposited cotton into a bag or other receptacle suitably suspended from or associated with the delivery mouth of the casing.

These, generally, are the essential and characteristic features of the construction which I have shown as an embodiment of the principles of my invention.

In the drawings, reference signs 4, 5, designate the two supporting wheels of the machine. In a simple embodiment of my invention the wheels are journaled on stub axles 6, which extend horizontally from a frame bar 7. The frame bar, intermediate its ends, is arched upwardly and is of such length as to enable the wheels 4, 5, to span the desired number of rows of cotton stalks, say, for instance, two. Extending forwardly from, and supported upon the arched portion of the frame bar 7, is a frame 8, braced by the struts 9, extending upwardly and forwardly from the lower ends of the vertical portions 10, of the frame bar. If desired a rack frame 11, may be mounted on the framing 8, to carry and transport the empty or the filled bags of cotton. At the forward end of the frame are connected the usual shafts 12, with hitching devices, swingle trees or the like, for hitching a horse or mule to the machine, may be connected, as indicated at 13.

The casing 14, is supported in any convenient manner, as, for instance, by straps 15, from the arched portion of the frame bar 7, and at a point about midway the length thereof, said casing extending downwardly and rearwardly into position to trail between the two rows of cotton stalks which are spanned by the wheels 4, 5. This casing is open at the top, and has outwardly flaring side edges 16, the lower end of the casing being closed, as shown at 17. At its upper end the casing is provided with a downwardly and forwardly turned delivery spout 18, having a frame 19, encompassing the same from which a bag or other receptacle 26, may be suspended in position to receive the picked cotton delivered from the casing. A conveyer is arranged to operate in the casing in the form shown in Figs. 1 and 2; this conveyer is in the form of a belt 20 and is carried over rollers 21, 22, at the upper and lower ends respectively of the casing, said carrier forming, in effect, a movable bottom for the casing.

It is obvious that any convenient form of conveyer may be employed. In Fig. 5, I have shown a conveyer in the form of a revolving screw 50. The conveyer may be driven in any convenient manner. In the arrangement shown in Figs. 1 and 2, the upper roller 22 over which the belt operates, is driven from gears 23, on the hubs of the wheels 4, 5, which drive shafts 24, the latter being geared to a shaft 25, on which the roller 22, is carried. It is obvious that any other suitable or convenient arrangement of gearing may be employed.

In Fig. 4 I have shown the shaft 25 driven by sprocket chains, one of which is shown at 51, which operate over sprocket gears 52, 53, respectively carried by the hubs of the wheels 4, 5, and by the shaft 25. Where a screw conveyer is employed as shown at 50, Fig. 5, the shaft of said conveyer may be geared to shaft 25 through the bevel gears indicated at 54.

If desired, and as shown in Fig. 1, the sides 16 of the casing 14 are not only flared outwardly but they are inclined away from each other toward their upper ends, thereby enlarging the receptacle. This facilitates the reception of the picked cotton and enables the operators to throw the cotton into this receptacle from a considerable distance away. This construction of casing also facilitates the movement of the casing between the adjacent rows of stalks without breaking off or injuring the branches of the stalks or unopened cotton bolls, and aids in preventing dried leaves or sticks being deposited in the receptacle from the stalks as the machine progresses along. If desired, and particularly where a trailing casing of considerable length is employed, the casing may be braced from the machine frame by side brace rods 56, which, if desired, may include the turnbuckles 57 for adjusting purposes.

The operation of the machine in use is very simple. It is drawn through the cotton field manually or by a mule or horse, and, being light, is easily handled. The speed of travel of the machine will be governed by the conditions of the cotton crop encountered. As the machine moves along the operators pick or gather the cotton by hand in the usual way and throw or deposit the same into the casing. The flaring and inclined sides of the casing enable the operators to throw the picked cotton into the casing from a considerable distance. The operators follow up the machine as it moves along and as many operators are accommodated by the machine as may be necessary or desired to gather the cotton in the rows of stalks spanned by the wheels as well as the adjacent rows if so desired. The operators not being required to support the bags themselves, and being free in their movements, are enabled to greatly increase their daily capacity in quantity of cotton picked and with less physical wear, toil and fatigue than is the case in present practice thereby enabling even children and women to be employed as operators. In case a steady advancement or progression of the machine causes a speed of travel too fast for the operators to keep up, the machine may be advanced in short stages. While standing still the picked cotton is deposited into the casing, and accumulates therein, but when the machine is again advanced the cotton which has accumulated in the casing is quickly conveyed to and deposited into the bag or receptacle 26, by the operation of the carrier. When a bag is filled, it is detached from its suspending support at the mouth of the delivery chute and placed on the ground to be subsequently loaded into a wagon and an empty bag is placed at the mouth of the delivery chute. If desired, the gearing which drives the carrier may be detachable at some convenient point whereby, when the operation of the carrier is not required when the machine is hauled along, as, for instance, while proceeding to or returning from the field, such gearing may be disconnected.

Having now set forth the object and nature of my invention, and a construction embodying the principles thereof, what I claim as new and useful, and of my own invention, and desire to secure by Letters Patent is:—

1. In a machine for use in gathering cotton, the combination of a pair of wheels, an axle supported by said wheels and arched or elevated between them, a receptacle supported at its forward end by said axle and inclined rearwardly from said axle toward the ground, said receptacle being open at its top throughout the greater part of its length, a conveyer in the bottom of said receptacle, and means for operating the conveyer.

2. In a machine for use in gathering cotton, the combination of a pair of wheels, an axle supported by said wheels and arched between the wheels, a receptacle supported at its forward end by said axle and inclined rearwardly from said axle toward the ground, said receptacle being open at its top throughout the greater part of its length, a conveyer in the bottom of said receptacle, and means actuated by said wheels for operating the conveyer.

3. In a machine for use in gathering cotton, the combination of a pair of wheels, an axle supported by said wheels, and arched between the wheels, a receptacle supported at its forward end by said axle, and inclined rearwardly from said axle toward the ground, and provided with a hopper-like lower portion, said receptacle being open from the hopper-like portion forwardly along its top, a conveyer in the bottom of said receptacle, and means for operating the conveyer.

4. In a machine for use in gathering cotton, the combination of an axle arched between its ends, a wheel journaled upon each end of the arched axle, a receptacle supported at its forward end upon the arched portion of said axle and inclined rearwardly and downwardly therefrom, said receptacle being open at its top and having outwardly flaring sides, a conveyer operating in said receptacle, and means for operating said conveyer.

5. In a machine for use in gathering cotton, a pair of wheels, an axle supported by said wheels and arched between them, a receptacle supported at its forward end and inclined downwardly and rearwardly therefrom, said receptacle being open at its top and provided with a down turned delivery mouth at its upper forward end, a conveyer operating in the bottom of said receptacle, means for suspending a bag below the delivery mouth, and means for operating said conveyer.

6. In a machine for use in gathering cotton, a pair of wheels, a frame including an axle supported by said wheels and arched between them, a receptacle supported at its forward end by the axle between said wheels, and inclined downwardly and rearwardly from said axle, said receptacle being open at its top and having outwardly flaring sides, a conveyer forming a movable bottom for said receptacle, gearing driven by said wheels for operating said conveyer, and means connected to the axle for moving said frame.

In testimony whereof I have hereunto set my hand in the presence of the subscribing witnesses, on this 27th day of May A. D., 1913.

JAMES F. O'SHAUGHNESSY.

Witnesses:
G. A. McGRATH,
W. A. DARBY.

---

Copies of this patent may be obtained for five cents each, by addressing the "Commissioner of Patents, Washington, D. C."